March 18, 1947.  B. O. E. PERSSON ET AL  2,417,519
PLANT FOR MELTING ICE AND PREVENTING ICE FORMATION
Filed June 27, 1945  2 Sheets-Sheet 1
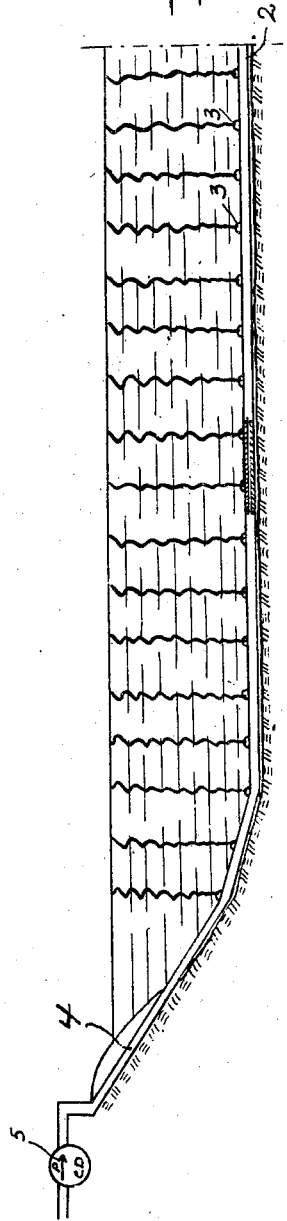
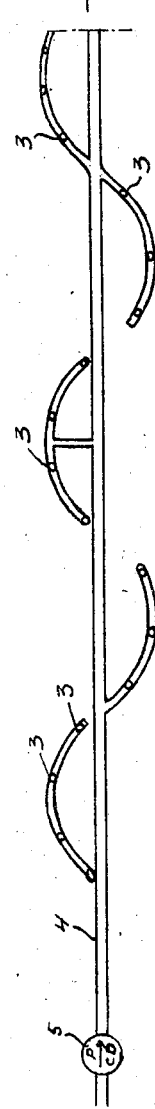
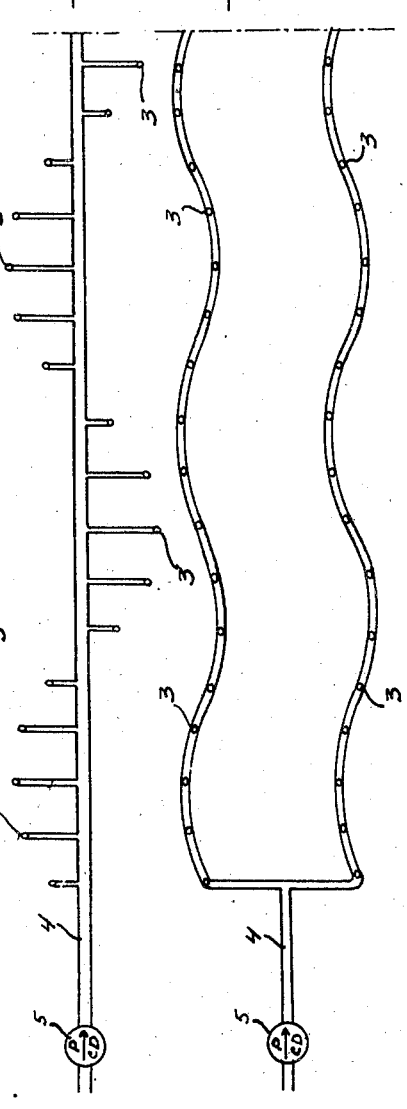

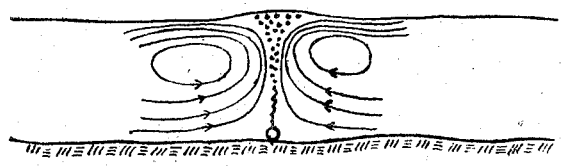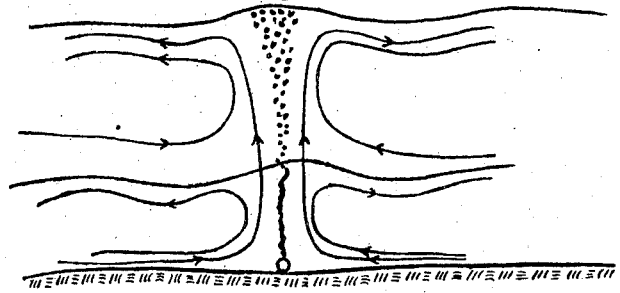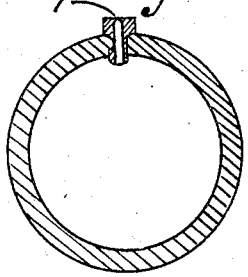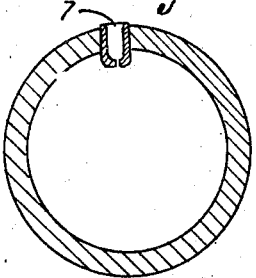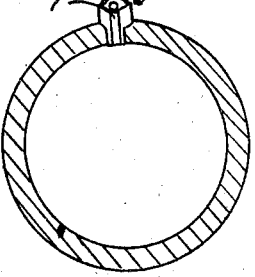

Patented Mar. 18, 1947

2,417,519

UNITED STATES PATENT OFFICE 2,417,519

PLANT FOR MELTING ICE AND PREVENTING ICE FORMATION

Bengt Oskar Erik Persson, Enebyberg, and Erik Forslind, Stockholm, Sweden

Application June 27, 1945, Serial No. 601,879
In Sweden July 3, 1944

9 Claims. (Cl. 61—1)

This invention relates to plants for melting ice and preventing ice-formation of the type which comprise a conduit submerged in water and having discharge openings for discharging an elastic fluid into the water. The elastic fluid discharged into the water causes rising currents in the water and the effect of these currents is to bring warmer water from a level below the surface to the surface where the melting of the ice takes place or ice-formation is prevented.

If a single straight pipe line is used melting takes place within an area extending some distance on both sides of the pipe line. It is one object of the invention to increase the width of this area above the pipe line in which melting takes place or formation of ice is prevented.

The invention will now be described in detail with reference to the accompanying drawings. In these Fig. 1 shows in vertical section one embodiment of the invention, whereas Fig. 2 shows a plan view of a second embodiment. Figs. 3 and 4 illustrate the water currents caused by the compressed elastic fluid and Fig. 5 (Figs. 5a, 5b and 5c) shows a section through one of the pipe lines used with a nozzle inserted therein. Figs. 6 and 7 show other embodiments of the invention where the discharge openings are placed along branch-pipes of various form. In Fig. 6 the branch-pipes are curved and in Fig. 7 they are straight. The connections to the main pipe are according to Figs. 6 and 7 preferably flexible or articulated. In a preferred embodiment the connection is performed as a valve which in a certain position closes the connection between the branch-pipe and the main pipe which is of a certain importance at flushing the pipes or in repair, etc.

As shown in Fig. 1 on the bottom 1 of a basin, a water way, etc., is stretched a pipe line 2 having outlets 3. The pipe line is curved in the horizontal plane similarly to the pipe lines shown in Fig. 2 and is by means of a feed line 4 connected to a compressor 5. Compressed air is discharged through the openings in the line 2 causing rising currents in the water which carry the warmer water below the surface to the surface for the melting of the ice and prevention of formation of ice. The nature of the water currents is shown in Figs. 3 and 4. As shown in Fig. 3 there is a continuous variation of the density of the water, whereas as shown in Fig. 4 this variation is discontinuous. The same effect is obtained in both cases and also with various combinations thereof.

When straight pipes are used the effect of the rising warmer water is limited to a comparatively narrow zone above the pipe line, independent of whether it is a case of melting ice or preventing ice-formation. By arranging the discharge openings in wave form, however, the width of the zone in which direct melting takes place is increased. The widening of the zone is caused by surface currents which from the concave parts converge towards the corresponding projecting portions of the ice so that these are melted. The width of the hole or the free channel in the ice equals the width for a straight pipe line increased with the width of the curved pipe line.

The distance between the curved portions in the direction of the pipe line may be about 2–10 m. and the distance at right angles thereto about 1–5 m., for example 1–2 m.

It is also possible to use two or more pipe lines each having the discharge openings on a wave line in the horizontal plane. If the pipe lines are parallel with each other they may be so arranged that the melting zones meet or even overlap each other but it is also possible to arranged the pipe lines so that the melting zones of the pipe lines are separated from each other. If it is a case of melting ice the ice is melted in the zones in which direct melting takes place and the ice floats formed between these zones are by wind and currents carried into the zones in which direct melting takes place. A similar effect is obtained when it is a case of preventing formation of ice so that also in this case the pipe lines may be placed at larger distances from each other than is required for the zones in which direct melting takes place to meet. The distance between the lines in the horizontal plane may be about 10–25 m.

Fig. 2 shows the use of two lines 2 which are curved in the horizontal plane and at the same time placed at such distance from each other that the zones in which direct melting takes place are separated from each other. In this way melting is effected within a relatively wide zone with the use of a comparatively small amount of power. The increased melting effect is obtained as a result of conveying currents in the surface of the water and the ice floats formed between the zones in which direct melting takes place being driven into these zones where the melting effect is at its maximum. A complete melting of the ice between the two pipe lines is therefore effected in a short time whereafter the hole or channel remains free.

Ordinary water pipes may be used for the pipe lines. The discharge openings may consist of holes formed in the wall of the pipes but as they should be small and resistant (rust-proof) it is preferable to use nozzles 7 of brass, nickel or other resistant material (compare Fig. 5). In order to limit the amount of air required and to minimize the pressure losses in the pipe lines which have comparatively small bore and are comparatively long, the holes should be small and removed from each other as much as is possible consistent with the required effect being obtained.

Using the above described apparatus sufficient melting effect is obtained if the holes have a diameter of 0.14 mm. and the distance between them is 0.5 m. or if the holes have a diameter of 0.30 mm. and the distance is 1.0 m. provided the maximum temperature of the water is not below $+ 0.4°$ C. If the maximum temperature is higher the amount of air used can be decreased (smaller holes and longer distances between them). In practice the holes may have a diameter of up to 2 mm. and the distance between the holes may vary between 0.10– 4.0 m., for example 0.25–2 m.

In order to increase the effect and to reduce the loss of pressure the air pressure in the pipe lines should be as high as possible and should of course be higher than the pressure of the water surrounding the pipe lines. For practical purposes the air pressure should be at least 1 kg./cm.$^2$ above that of the surrounding water. The feed pressure should as a rule for normal compressors be about 5–7 atmospheres above the atmospheric pressure and the plant should be so designed that there will be no idle running of the compressor.

The conections between the pipes should be of a type which enables rapid connections to be made in order to facilitate repair of defective parts.

In addition to keeping ports, harbour entrances, water ways and the like open for navigation in the winter time the invention may also be applied to structures for power stations, timber floating and the like if and as permitted by temperature of the water.

What we claim is:

1. An apparatus for melting ice and preventing formation of ice in water, including water ways, harbours, harbour entrances etc., comprising a conduit submerged in the water and means for supplying the conduit with a compressed elastic fluid, the conduit having discharge openings for the compressed elastic fluid arranged along a curved line in the horizontal plane in wave form to the main direction of the conduit to produce wave currents to the fluids that amplify each other to facilitate melting of the ice and which also widen the active zone above the conduit.

2. An apparatus as claimed in claim 1 and further characterized by said discharge openings being arranged on branch-pipes extending from a main-conduit.

3. An apparatus as claimed in claim 1 and further characterized by said discharge openings being arranged on curved branch-pipes extending from a main-conduit.

4. An apparatus as claimed in claim 1 and further characterized by said discharge openings being provided with nozzles of the type in which a large aperture grows smaller.

5. An apparatus as claimed in claim 1 and further characterized by said discharge openings being provided with nozzles of the type in which a small aperture grows larger.

6. An apparatus as claimed in claim 1 and further characterized by said discharge openings being arranged along a curved line the interspaces of the bends being about 2–10 m. in the longitudinal direction and about 1–5 m. in the transverse direction.

7. An apparatus for melting ice and preventing formation of ice in water, including water ways, harbours, harbour entrances etc., comprising spaced conduits submerged in the water and means for supplying the conduits with a compressed elastic fluid, each conduit having discharge openings for the compressed elastic fluid arranged along a curved line in the horizontal plane in wave form to the main direction of the conduit to provide wave currents to the fluid that amplify each other to facilitate melting of the ice, the conduits being placed at such a distance from one another to form an ice-free channel above each conduit.

8. An apparatus as claimed in claim 7 and further characterized by said conduits being arranged at such a distance from each other that their melting zones are separated from each other.

9. An apparatus as claimed in claim 7 and further characterized by said conduits being aranged at a distance of about 10–25 m. from each other.

BENGT OSKAR ERIK PERSSON.
ERIK FORSLIND.

REFERENCES CITED

The following references are of record in the file of this patent:

UNITED STATES PATENTS

| Number | Name | Date |
|---|---|---|
| 843,926 | Brasher | Feb. 12, 1907 |

FOREIGN PATENTS

| Number | Country | Date |
|---|---|---|
| 442,046 | French | 1912 |